Nov. 26, 1929.   C. A. DREISBACH   1,736,822
PISTON MECHANISM FOR ENGINES AND PUMPS
Filed June 23, 1927   3 Sheets-Sheet 1
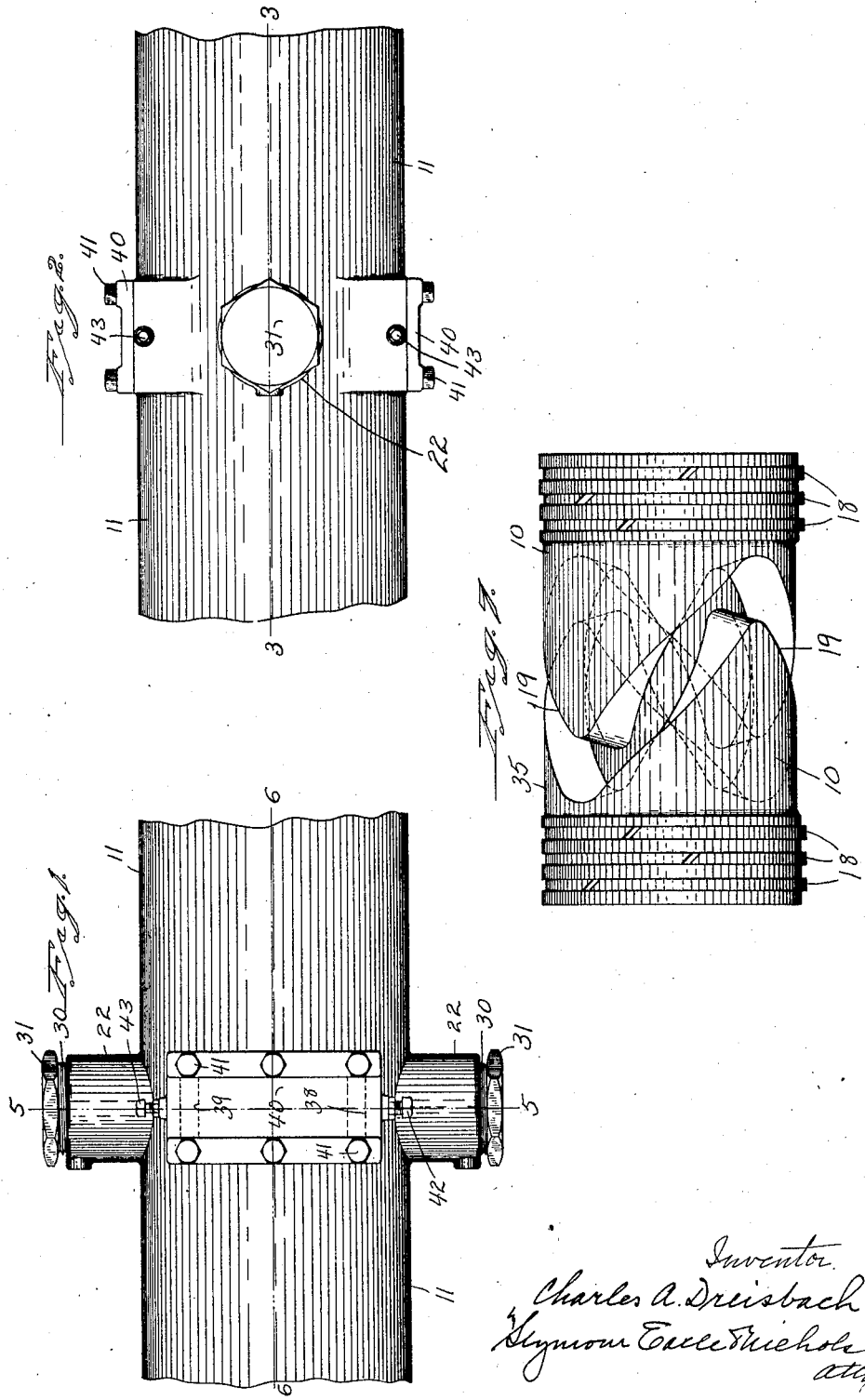

Nov. 26, 1929.   C. A. DREISBACH   1,736,822
PISTON MECHANISM FOR ENGINES AND PUMPS
Filed June 23, 1927   3 Sheets-Sheet 2
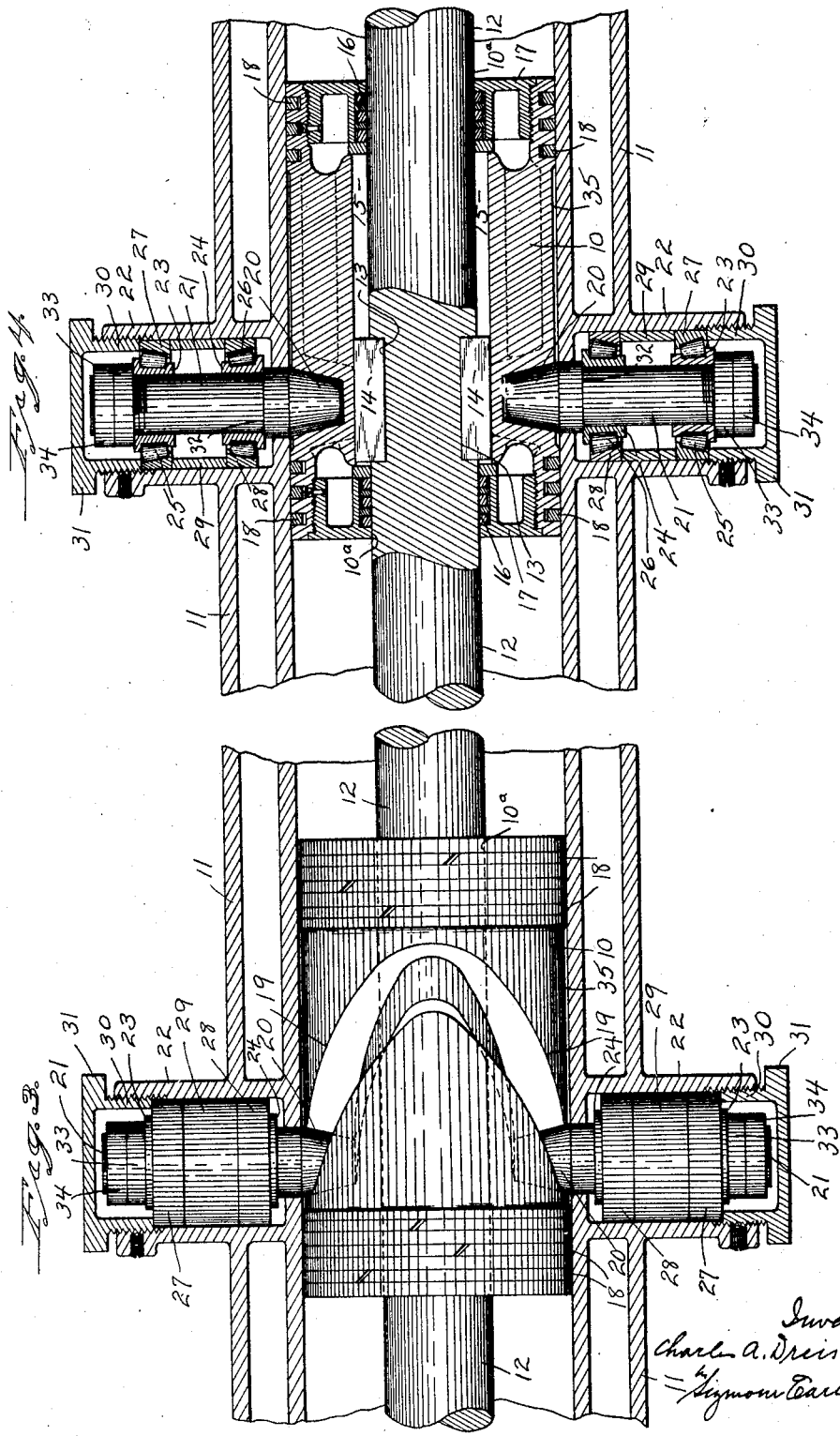

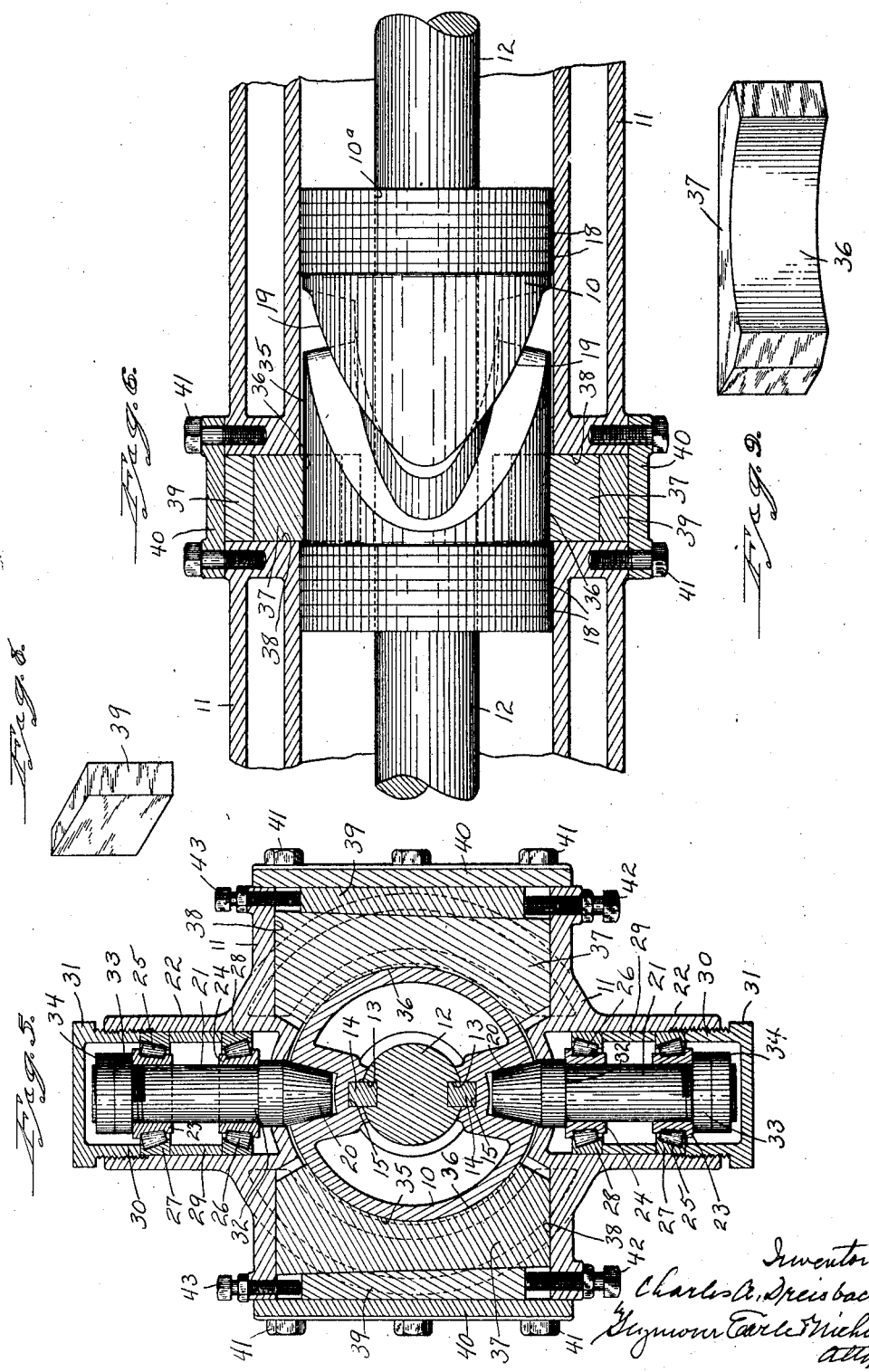

Patented Nov. 26, 1929

1,736,822

UNITED STATES PATENT OFFICE

CHARLES A. DREISBACH, OF NEW HAVEN, CONNECTICUT

PISTON MECHANISM FOR ENGINES AND PUMPS

Application filed June 23, 1927. Serial No. 200,830.

This invention relates to an improvement in piston mechanisms for engines and pumps, and particularly to double-acting pistons of the general character shown in United States Patent No. 1,629,686, granted to me May 24, 1927. The object of this invention is to provide a mechanism of the class described, constructed with particular reference to being adjustable, to compensate for wear to avoid vibration.

With this object in view, my invention consists in a piston mechanism for engines and pumps having certain details of construction and combinations of parts as will be hereinafter described and particularly recited in the claims.

In the accompanying drawings:

Fig. 1 is a broken view in elevation of a cylinder enclosing my improved piston mechanism;

Fig. 2 is a view corresponding to Fig. 1 but viewing the same from a right angle;

Fig. 3 is a longitudinal sectional view through the cylinder on the line 3—3 of Fig. 2 but showing the piston and associated parts in elevation;

Fig. 4 is a corresponding view, but also showing the piston, shaft and guide-pin bearings in section;

Fig. 5 is a transverse sectional view on the line 5—5 of Fig. 1;

Fig. 6 is a view of the cylinder, bearing-blocks and adjusting-wedges in longitudinal section on the line 6—6 of Fig. 1 and showing the piston and shaft in elevation;

Fig. 7 is a detached view in side elevation of the piston;

Fig. 8 is a detached perspective view of one of the adjusting-wedges; and

Fig. 9 is a corresponding view of one of the bearing-blocks.

In carrying out my invention as herein shown, I employ a piston 10 which is designed to rotate as well as reciprocate within a water-jacketed cylinder 11, which latter may be of any approved construction. Extending through an axial shaft-passage 10ª in the piston 10 is a shaft 12 formed at diametrically-opposite points on its surface with two longitudinally-arranged key-sockets 13 receiving keys 14 which project beyond the periphery of the said shaft and into two longitudinal key-grooves 15 formed upon the interior surface of the piston 10. The keys 14 and grooves 15 just described serve to couple the piston 10 and shaft 12 together for concurrent rotary movement and, at the same time, permit the piston to have reciprocating movement with respect to the said shaft, as will hereinafter appear.

At each of its opposite ends I provide the piston with a series of internal packing-rings 16 co-acting with the periphery of the shaft 12 to prevent leakage through the passage 10ª and held in place by a cap 17 threaded into the piston, as shown in Fig. 4. Similarly, the opposite ends of the exterior of the piston are each provided with a series of packing-rings 18 to prevent the leakage of gases or other fluids between the exterior of the piston and the interior of the cylinder 11 in the same manner that the internal packing-rings 16 prevent the escape of fluid between the interior of the piston and the exterior of the shaft 12.

Formed in the exterior periphery of the piston 10 is a helical cam-groove 19 having reversely-inclined reaches which are tapered in cross-section, as shown in Fig. 3, and adapted to receive the tapered heads 20—20 of two corresponding radially-arranged guide-pins 21—21, each of which is mounted for rotary movement within a tubular bearing-housing 22 radially-offsetting from the cylinder 11. At its opposite ends each guide-pin is provided with two inner roller-races 23 and 24 respectively co-acting with an annular series of tapered rollers 25 and 26 which, in turn, respectively co-act with outer roller-races 27 and 28 fitting snugly within the interior of the bearing-housing 22 with capacity for axial adjustment therein. The two outer races 27 and 28 just mentioned are spaced apart by a spacing-ring 29, and the first-mentioned race is engaged by a tubular flange 30 which is threaded into the outer end of the bearing-housing 22 and forms an integral extension of a polygonal cap 31. As may be required to compensate for wear between the head 20 of the guide-pin 21 and the cam-groove 19, the said head may be moved more deeply into the cam-groove by screwing the cap 31 further into the housing 22, so that the flange 30 will force the outer race 27 inward and, at the same time, similarly move the complementary outer race 28 through the intermediary of the spacing-ring 29. The inward movement of the races 27 and 28, as just described, correspondingly moves both series of rollers 25 and 26 and the inner races 23 and 24 so as to force the inner end of the latter against a shoulder 32 formed at the junction of the head 20 with a guide-pin 21 proper. The outer end of each of the guide-pins 21 is threaded for the reception of a nut 33 which bears against the outer end of the inner roller-race 23 and is locked in place by means of a corresponding locking-nut 34.

To centralize the piston 10 within the cylinder 11, so as to avoid undue wear between the two said parts, the piston is slightly reduced in diameter between its ends, as clearly shown in Fig. 7, to provide a bearing-surface 35 for co-action with the curved bearing-surfaces 36—36 of two corresponding bearing-blocks 37—37 which are located at diametrically-opposite points in rectangular passages 38—38 opening radially out of the interior of the cylinder 11 in line with and at a right angle to the bearing-housings 22. To provide for adjusting the bearing-blocks 37 just described, with reference to the piston 10, I provide each upon its outer face with an adjusting-wedge 39, which is held in place in the appropriate passage 38 by means of a cap-plate 40 closing the outer end of the said passage and secured in place by means of bolts 41. Each of the adjusting-wedges 39 is engaged at its thickest end by an adjusting-screw 42 and at its opposite and thinner end by a stop-screw 43, as clearly shown in Fig. 5 of the drawings.

In the event that my improved piston mechanism is embodied in an engine, its operation will be as follows:

As pressure is exerted laterally against the opposite faces of the piston 10, the same will be caused to reciprocate within the cylinder 11 and with respect to the shaft 12. Owing to the presence of the heads 20 of the guide-pins 21 in the cam-groove 19, the piston will also be caused to rotate, with the effect of rotating the shaft 12 through the medium of the keys 14 which, as before described, permit the piston to have reciprocating movement with respect to the said shaft but couple them together for concurrent rotary movement. The shaft 12 may be coupled to the mechanism to be driven in any approved manner.

If, on the other hand, my improved piston mechanism is embodied in a pump and power is applied to the shaft 12 to rotate the same, the keys 14 will cause the piston to rotate therewith. This rotary movement of the piston will cause its cam-groove 19 to co-act with the heads 20 of the guide-pins 21, with the effect of bodily reciprocating the piston with respect to both the shaft and cylinder, so that the piston may be utilized to compress air, pump water, or to serve any purpose for which pumps are adapted.

I claim:

1. The combination with a cylinder, of a piston mechanism comprising a rotary and reciprocating piston located in the said cylinder and formed with an axial shaft-passage extending therethrough from end to end; a shaft extending through the said passage; means for coupling the said piston to the said shaft for rotation therewith and reciprocation with respect thereto; two complementary adjustable bearing-blocks mounted in the said cylinder and respectively engaging the said piston on opposite sides thereof to center the same; a helical cam-groove located in the exterior surface of the said piston and formed with reversely-inclined reaches; and axially-adjustable guide-means mounted in the said cylinder and co-acting with the side cam-groove.

2. The combination with a cylinder, of a piston mechanism comprising a rotary and reciprocating piston located in the said cylinder and formed with an axial shaft-passage extending therethrough from end to end; a shaft extending through the said passage; means for coupling the said piston to the said shaft for rotation therewith and reciprocation with respect thereto; two complementary adjustable bearing-blocks mounted in the said cylinder and respectively engaging the said piston on opposite sides thereof to center the same; an adjusting-wedge for each of the said bearing-blocks; means for locking the said wedges in various positions of adjustment; a helical cam-groove located in the exterior surface of the said piston and formed with reversely-inclined reaches; and axially-adjustable guide-means mounted in the said cylinder and co-acting with the said cam-groove.

3. The combination with a cylinder, of a piston mechanism comprising a rotary and reciprocating piston located in the said cylinder and formed with an axial shaft-passage extending therethrough from end to end; a shaft extending through the said passage; means for coupling the said piston to the said shaft for rotation therewith and reciprocation with respect thereto; two radial passages formed in the said cylinder at diametrically-opposite points therein; a radially-adjustable bearing-block located in each of the said passages and engaging the said piston on opposite sides thereof to center the same; a helical cam-groove located in the exterior surface of the said piston and formed with reversely-inclined reaches; and axially-adjustable guide-means mounted in the said cylinder and co-acting with the said cam-groove.

4. The combination with a cylinder, of a piston mechanism comprising a rotary and reciprocating piston located in the said cylinder and formed with an axial shaft-passage extending therethrough from end to end; a shaft extending through the said passage; means for coupling the said piston to the said shaft for rotation therewith and reciprocation with respect thereto; two radial passages formed in the said cylinder at diametrically-opposite points therein; a radially-adjustable bearing-block located in each of the said passages and engaging the said piston on opposite sides thereof to center the same; an adjusting-wedge for each bearing-block; means for locking the said wedge in various positions of adjustment; a helical cam-groove located in the exterior surface of the said piston and formed with reversely-inclined reaches and axially-adjustable guide-means mounted in the said cylinder and co-acting with the said cam-groove.

5. The combination with a cylinder, of a rotary and reciprocating piston located in the said cylinder; two complementary adjustable bearing-blocks mounted in the said cylinder and respectively engaging the said piston on opposite sides thereof to center the same; and means for adjusting the said bearing-blocks radially with respect to the said piston.

6. The combination with a cylinder, of a rotary and reciprocating piston located in the said cylinder; two complementary adjustable bearing-blocks mounted in the said cylinder and respectively engaging the said piston on opposite sides thereof to center the same; an adjustable wedge for each of the said bearing-blocks for moving the same radially with respect to the said piston; and means for locking the said wedges in various positions of adjustment.

7. The combination with a cylinder, of a rotary and reciprocating piston located in the said cylinder; two radial passages formed in the said cylinder at diametrically-opposite points therein; a radially-adjustable bearing-block located in each of the said passages and engaging the said piston on opposite sides thereof to center the same; and means for adjusting the said bearing-blocks radially with respect to the said piston.

8. The combination with a cylinder, of a rotary and reciprocating piston located in the said cylinder; two radial passages formed in the said cylinder at diametrically-opposite points therein; a radially-adjustable bearing-block located in each of the said passages and engaging the said piston on opposite sides thereof to center the same; a tangentially-movable adjusting-wedge for each bearing-block; and means for locking the said wedge in various positions of adjustment.

9. The combination with a cylinder, of a piston mechanism comprising a rotary and reciprocating piston located in said cylinder; a helical cam-groove located in the exterior surface of the said piston and formed with reversely-inclined reaches; an axially-adjustable rotary guide-pin mounted in a radial passage in the said cylinder and co-acting with the said cam-groove; a pair of inner races carried by the said guide-pin near the respective opposite ends thereof; a pair of complementary outer races mounted in the said radial passage; rotary anti-friction means interposed between the said inner and outer races; means carried by the said guide-pin for adjusting the said inner races one toward the other; and adjusting-means formed independent of the said races for bodily moving the same together with the said guide-pin radially with respect to the piston.

In testimony whereof, I have signed this specification.

CHARLES A. DREISBACH.